United States Patent
Shen et al.

(10) Patent No.: US 10,554,231 B2
(45) Date of Patent: Feb. 4, 2020

(54) TERMINAL AND COMMUNICATION METHOD THEREOF

(71) Applicant: Huawei Technologies Co., Ltd., Shenzhen (CN)

(72) Inventors: Li Shen, Beijing (CN); Bangshi Yin, Beijing (CN); Kun Li, Beijing (CN); Songping Yao, Beijing (CN); Anmin Xu, Shenzhen (CN); Shumin Liu, Beijing (CN); Shui Liu, Beijing (CN)

(73) Assignee: HUAWEI TEHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/748,964

(22) PCT Filed: Jul. 27, 2016

(86) PCT No.: PCT/CN2016/091926
§ 371 (c)(1),
(2) Date: Jan. 30, 2018

(87) PCT Pub. No.: WO2017/016490
PCT Pub. Date: Feb. 2, 2017

(65) Prior Publication Data
US 2019/0007074 A1      Jan. 3, 2019

(30) Foreign Application Priority Data

Jul. 30, 2015   (CN) .......................... 2015 1 0465878
Aug. 12, 2015  (CN) .......................... 2015 1 0493931

(51) Int. Cl.
*H04B 1/00*       (2006.01)
*H04W 88/06*   (2009.01)
(Continued)

(52) U.S. Cl.
CPC ......... *H04B 1/0064* (2013.01); *H04B 1/3816* (2013.01); *H04B 7/0689* (2013.01); *H04W 8/183* (2013.01); *H04W 88/06* (2013.01)

(58) Field of Classification Search
CPC .. H04B 1/0064; H04B 1/3816; H04B 7/0689; H04W 8/183; H04W 88/06
See application file for complete search history.

(56) References Cited

U.S. PATENT DOCUMENTS 8,725,101 B2      5/2014 Ruohonen et al.
2005/0009484 A1*  1/2005 Imai .................. H03F 3/195
                                                    455/144
(Continued)

FOREIGN PATENT DOCUMENTS

CN    101494929 A    7/2009
CN    202135121 U    2/2012
(Continued)

OTHER PUBLICATIONS

Machine Translation and Abstract of Chinese Publication No. CN103002433, Mar. 27, 2013, 10 pages.
(Continued)

*Primary Examiner* — Dinh Nguyen
(74) *Attorney, Agent, or Firm* — Conley Rose, P.C.

(57) ABSTRACT

A terminal includes a first baseband processor, a second baseband processor, a first radio frequency chip, a second radio frequency chip, a first antenna, a second antenna, a third antenna, and a fourth antenna. The first baseband processor is coupled to the first antenna and the second antenna using the first radio frequency chip. The first radio frequency chip is coupled to the first antenna to form a first channel, and is coupled to the second antenna to form a second channel. The second baseband processor is coupled to the third antenna and the fourth antenna using the second radio frequency chip. The second radio frequency chip is
(Continued)

coupled to the third antenna to form a third channel, and is coupled to the fourth antenna to form a fourth channel.

19 Claims, 2 Drawing Sheets

(51) Int. Cl.
*H04B 1/3816* (2015.01)
*H04B 7/06* (2006.01)
*H04W 8/18* (2009.01)

(56) References Cited

U.S. PATENT DOCUMENTS

| | | | |
|---|---|---|---|
| 2005/0014477 A1* | 1/2005 | Ballantyne | H04B 1/405 455/127.3 |
| 2009/0270128 A1 | 10/2009 | Jheng et al. | |
| 2011/0151858 A1* | 6/2011 | Lai | H04W 48/18 455/422.1 |
| 2012/0182938 A1* | 7/2012 | Mujtaba | H04W 88/06 370/328 |
| 2012/0287887 A1 | 11/2012 | Jung et al. | |
| 2013/0058216 A1 | 3/2013 | Krishnaswamy et al. | |
| 2013/0156081 A1 | 6/2013 | Tat et al. | |
| 2014/0185498 A1* | 7/2014 | Schwent | H04B 1/0057 370/297 |
| 2015/0334575 A1* | 11/2015 | Joshi | H04W 72/0453 370/329 |
| 2016/0365995 A1 | 12/2016 | Liu et al. | |

FOREIGN PATENT DOCUMENTS

| | | |
|---|---|---|
| CN | 103002433 A | 3/2013 |
| CN | 103209502 A | 7/2013 |
| CN | 103379672 A | 10/2013 |
| CN | 103731889 A | 4/2014 |
| CN | 103781202 A | 5/2014 |
| JP | 2014531148 A | 11/2014 |
| KR | 20110112172 A | 10/2011 |
| WO | 2014127521 A1 | 8/2014 |
| WO | 2014151583 A1 | 9/2014 |
| WO | 2015105813 A2 | 7/2015 |
| WO | 2016077151 A1 | 5/2016 |

OTHER PUBLICATIONS

Machine Translation and Abstract of Chinese Publication No. CN103379672, Oct. 30, 2013, 31 pages.
Machine Translation and Abstract of Chinese Publication No. CN103731889, Apr. 16, 2014, 23 pages.
Machine Translation and Abstract of Chinese Publication No. CN202135121, Feb. 1, 2012, 12 pages.
Foreign Communication From a Counterpart Application, PCT Application No. PCT/CN2016/091926, English Translation of International Search Report dated Oct. 28, 2016, 2 pages.
Foreign Communication From a Counterpart Application, PCT Application No. PCT/CN2016/091926, English Translation of Written Opinion dated Oct. 28, 2016, 5 pages.
Machine Translation and Abstract of Chinese Publication No. CN101494929, Jul. 29, 2009, 11 pages.
Machine Translation and Abstract of Chinese Publication No. CN103209502, Jul. 17, 2013, 25 pages.
Foreign Communication From a Counterpart Application, Chinese Application No. 201510493931.4, Chinese Office Action dated Sep. 28, 2018, 7 pages.
Foreign Communication From a Counterpart Application, European Application No. 16829855.2, Extended European Search Report dated Jun. 22, 2018, 8 pages.
Foreign Communication From a Counterpart Application, Korean Application No. 10-2018-7005290, Korean Office Action dated Jan. 11, 2019, 5 pages.
Foreign Communication From a Counterpart Application, Korean Application No. 10-2018-7005290, English Translation of Korean Office Action dated Jan. 11, 2019, 4 pages.
Foreign Communication From a Counterpart Application, Japanese Application No. 2018-504678, Japanese Office Action dated Jan. 28, 2019, 3 pages.
Foreign Communication From a Counterpart Application, Japanese Application No. 2018-504678, English Translation of Japanese Office Action dated Jan. 28, 2019, 4 pages.

* cited by examiner

TERMINAL AND COMMUNICATION METHOD THEREOF

CROSS REFERENCE TO RELATED APPLICATIONS

This application is a U.S. National Stage of International Patent Application No. PCT/CN2016/091926 filed on Jul. 27, 2016, which claims priority to Chinese Patent Application No. 201510465878.7 filed on Jul. 30, 2015 and Chinese Patent Application No. 201510493931.4 filed on Aug. 12, 2015. All of the aforementioned applications are hereby incorporated by reference in their entireties.

TECHNICAL FIELD

Embodiments of the present disclosure relate to the field of communications technologies, and in particular to a terminal and a communication method thereof.

BACKGROUND 3G is a third-generation mobile communications technology, and is a cellular mobile communications technology supporting high-speed data transmission. Long Term Evolution (LTE) is a new generation mobile communication standard developed by the $3^{rd}$ Generation Partnership Project (3GPP). Compared with other communication standards, LTE has a higher transmission rate and better transmission quality, and currently becomes a popular communication standard. An existing fourth-generation mobile communications technology (4G) may include two standards, time division LTE (TD-LTE) and frequency division duplex LTE (FDD-LTE).

Two subscriber identity module (SIM) cards may be simultaneously inserted in a dual SIM mobile phone, and the two cards are both in standby mode. However, in existing dual SIM mobile phones, only one SIM card can support 3G or 4G services, and the other SIM can only support second generation (2G) services. Therefore, in the existing dual SIM mobile phones, the two SIM cards cannot simultaneously support 3G or 4G services.

SUMMARY

Embodiments of the present disclosure provide a terminal and a communication method thereof in order to support 3G or later-generation services of multiple SIM cards.

A first aspect of the embodiments of the present disclosure provides a terminal, including a first baseband processor, a second baseband processor, a first radio frequency chip, a second radio frequency chip, a first antenna, a second antenna, a third antenna, and a fourth antenna, where the first baseband processor is connected to a first card slot, the second baseband processor is connected to a second card slot, the first baseband processor, the second baseband processor, the first radio frequency chip, and the second radio frequency chip all support an access capability of a third-generation or later-generation mobile communications technology. The first baseband processor is connected to the first antenna using the first radio frequency chip, and the first radio frequency chip is connected to the first antenna to form a first channel. The first baseband processor is connected to the second antenna using the first radio frequency chip, and the first radio frequency chip is connected to the second antenna to form a second channel. The second baseband processor is connected to the third antenna using the second radio frequency chip, and the second radio frequency chip is connected to the third antenna to form a third channel, and the second baseband processor is connected to the fourth antenna using the second radio frequency chip, and the second radio frequency chip is connected to the fourth antenna to form a fourth channel, where the first channel, the second channel, the third channel, and the fourth channel are configured to transmit data between the terminal and an external device.

With reference to the first aspect, in a first possible implementation of the first aspect, the first baseband processor is connected to the second radio frequency chip using a switch, and the first baseband processor is further configured to transmit the data using the first channel and the third channel if the third channel is idle and when the first baseband processor transmits data using the first channel.

With reference to the first aspect or the first possible implementation thereof, in a second possible implementation of the first aspect, the first baseband processor is further configured to transmit the data using the first channel, the second channel, the third channel, and the fourth channel if the third channel and the fourth channel are idle and when the first baseband processor transmits data using the first channel and the second channel, or transmit the data using the first channel, the second channel, and the third channel if the third channel is idle and when the first baseband processor transmits data using the first channel and the second channel.

With reference to the first aspect or the first or second possible implementation thereof, in a third possible implementation of the first aspect, the first baseband processor and the second baseband processor are integrated in a processor, or the first baseband processor and the second baseband processor are independently disposed in the terminal.

With reference to any one of the first aspect or the first to the third possible implementations thereof, in a fourth possible implementation of the first aspect, the second antenna and the fourth antenna are a same antenna, or the second antenna and the fourth antenna are independently disposed in the terminal.

With reference to any one of the first aspect or the first to the fourth possible implementations thereof, in a fifth possible implementation of the first aspect, the first antenna and the third antenna are main antennas, and the second antenna and the fourth antenna are diversity antennas.

With reference to any one of the first aspect or the first to the fifth possible implementations thereof, in a sixth possible implementation of the first aspect, the third-generation or later-generation mobile communications technology includes a 3G, a 4G, or a fifth-generation mobile communications technology (5G).

A second aspect of the embodiments of the present disclosure provides a communication method of a terminal. The terminal includes a first baseband processor, a second baseband processor, a first radio frequency chip, a second radio frequency chip, a first antenna, a second antenna, a third antenna, and a fourth antenna, where the first baseband processor is connected to a first card slot, the second baseband processor is connected to a second card slot, the first baseband processor, the second baseband processor, the first radio frequency chip, and the second radio frequency chip all support an access capability of a third-generation or later-generation mobile communications technology. The first baseband processor is connected to the first antenna using the first radio frequency chip, and the first radio frequency chip is connected to the first antenna to form a first channel. The first baseband processor is connected to the second antenna using the first radio frequency chip, and the first radio frequency chip is connected to the second antenna to form a second channel. The second baseband processor is connected to the third antenna using the second radio frequency chip, and the second radio frequency chip is connected to the third antenna to form a third channel. The second baseband processor is connected to the fourth antenna using the second radio frequency chip, and the second radio frequency chip is connected to the fourth antenna to form a fourth channel, where the first channel, the second channel, the third channel, and the fourth channel are configured to transmit data between the terminal and an external device, and the first baseband processor is connected to the second radio frequency chip using a switch, and the communication method includes transmitting, by the first baseband processor, the data using the first channel and the third channel if the third channel is idle and when the first baseband processor transmits data using the first channel, transmitting, by the first baseband processor, the data using the first channel, the second channel, the third channel, and the fourth channel if the third channel and the fourth channel are idle and when the first baseband processor transmits data using the first channel and the second channel, or transmitting, by the first baseband processor, the data using the first channel, the second channel, and the third channel if the third channel is idle and when the first baseband processor transmits data using the first channel and the second channel.

With reference to the second, in a first possible implementation of the second aspect, the first baseband processor and the second baseband processor are integrated in a processor, or the first baseband processor and the second baseband processor are independently disposed in the terminal.

With reference to the second aspect or the first possible implementation thereof, in a second possible implementation of the second aspect, the second antenna and the fourth antenna are a same antenna, or the second antenna and the fourth antenna are independently disposed in the terminal.

With reference to the second aspect or the first or the second possible implementation thereof, in a third possible implementation of the second aspect, the first antenna and the third antenna are main antennas, and the second antenna and the fourth antenna are diversity antennas.

With reference to any one of the second aspect or the first to the third possible implementations thereof, in a sixth possible implementation of the first aspect, the 3G or later-generation mobile communications technology includes a 3G, a 4G, or a 5G.

According to the embodiments of the present disclosure, the terminal is provided with a first baseband processor and a second baseband processor. The first baseband processor is connected to a first antenna and a second antenna using a first radio frequency chip, and the second baseband processor is connected to a third antenna and a fourth antenna using a second radio frequency chip. The first radio frequency chip is connected to the first antenna to form a first channel, the first radio frequency chip is connected to the second antenna to form a second channel, the second radio frequency chip is connected to the third antenna to form a third channel, and the second radio frequency chip is connected to the fourth antenna to form a fourth channel. The first baseband processor, the second baseband processor, the first radio frequency chip, and the second radio frequency chip all support 3G or later-generation access capabilities. Because the first baseband processor and the second baseband processor each are provided with channels that are configured to transmit data and support 3G or later-generation access capabilities, two SIM cards can simultaneously perform services of 3G or later generations.

DESCRIPTION OF EMBODIMENTS

In the following description, to illustrate rather than limit, specific details such as a particular system structure, an interface, and a technology are provided to make a thorough understanding of the present disclosure. However, a person skilled in the art should know that the present disclosure may be practiced in other implementation manners without these specific details. In other cases, detailed descriptions of well-known apparatuses, circuits, and methods are omitted such that the present disclosure is described without being obscured by unnecessary details.

A terminal described in the embodiments of the present disclosure may be a terminal device, such as a tablet computer, a notebook computer, an ultra-mobile personal computer (UMPC), a netbook, or a personal digital assistant (PDA).

Figure 1:
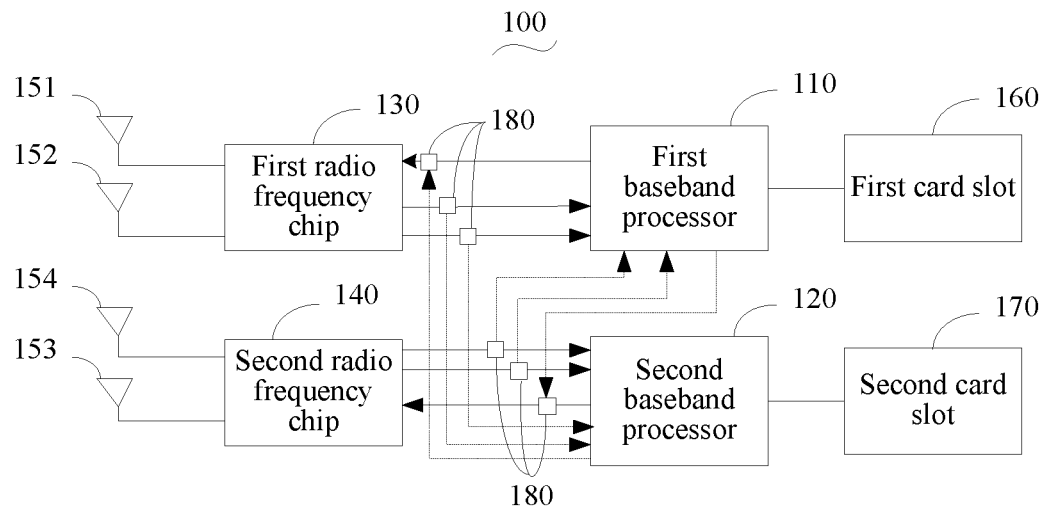
FIG. 1 is a schematic structural diagram of a terminal according to an embodiment of the present disclosure.

Referring to FIG. 1, FIG. 1 is a schematic structural diagram of a terminal 100 according to an embodiment of the present disclosure. In this embodiment, the terminal 100 includes a first baseband processor 110, a second baseband processor 120, a first radio frequency chip 130, a second radio frequency chip 140, a first antenna 151, a second antenna 152, a third antenna 153, a fourth antenna 154, a first card slot 160 connected to the first baseband processor 110, and a second card slot 170 connected to the second baseband processor 120. The first card slot 160 and the second card slot 170 are both configured to accommodate SIM cards. The first baseband processor 110, the second baseband processor 120, the first radio frequency chip 130, and the second radio frequency chip 140 all support an access capability of a 3G or later-generation mobile communications technology. The 3G or later-generation mobile communications technology includes a 3G, a 4G, a 5G, or the like. The 4G may include TD-LTE and FDD-LTE, may also include LTE Advanced, and may further include another technology meeting a next generation wireless communication standard International Mobile Telephony Advanced (IMT-Advanced) described by the International Telecommunication Union (ITU).

The first baseband processor 110 is connected to the first antenna 151 using the first radio frequency chip 130, the first baseband processor 110 is connected to the second antenna 152 using the first radio frequency chip 130, the second baseband processor 120 is connected to the third antenna 153 using the second radio frequency chip 140, and the second baseband processor 120 is connected to the fourth antenna 154 using the second radio frequency chip 140.

The first radio frequency chip 130 is connected to the first antenna 151 to form a first channel, the first radio frequency chip 130 is connected to the second antenna 152 to form a second channel, the second radio frequency chip 140 is connected to the third antenna 153 to form a third channel, and the second radio frequency chip 140 is connected to the fourth antenna 154 to form a fourth channel.

The first channel, the second channel, the third channel, and the fourth channel are configured to transmit data between the terminal 100 and an external device. The external device may be any network-side device such as a base station, or may be another terminal.

The first baseband processor 110 may be selectively connected to the third channel or the fourth channel. For example, a switch 180 may be disposed between the first baseband processor 110 and the second radio frequency chip 140, and the first baseband processor 110 may be connected to or disconnected from the third channel or the fourth channel by controlling the switch 180. Further, as shown in FIG. 1, the first baseband processor 110 may be connected to the second radio frequency chip 140 using the switch 180. When need to transmit data using the third channel, the first baseband processor 110 is connected to the third channel by controlling the switch 180, and when need to transmit data using the fourth channel, the first baseband processor 110 is connected to the fourth channel by controlling the switch 180. It should be noted that, the switch 180 may be a switch having a function of connecting or disconnecting multiple channels, or the switch 180 may be multiple switches, and one switch is disposed in each channel.

In an implementation of this embodiment, the first antenna 151 and the third antenna 153 may be main antennas that are configured to transmit uplink data and downlink data. Correspondingly, the first channel and the third channel are also configured to transmit the uplink data and downlink data. The second antenna 152 and the fourth antenna 154 may be diversity antennas that are configured to transmit downlink data. Corresponding, the second channel and the fourth channel are also configured to transmit the downlink data. It may be understood that, the foregoing antennas are not limited the foregoing types. That is, in another implementation, the foregoing antennas may be set as corresponding types of antennas according to actual requirements. For example, the foregoing antennas are all antennas that can transmit uplink data and downlink data. Alternatively, the first antenna 151 and the third antenna 153 are antennas that can transmit uplink data, and the second antenna 152 and the fourth antenna 154 are antennas that can transmit downlink data. The uplink data refers to data sent by the terminal 100 to a network side, and the downlink data refers to data sent by the network side to the terminal 100.

Based on the foregoing terminal structure, after detecting that a SIM card is placed in the first card slot 160 connected to the first baseband processor 110, the first baseband processor 110 may perform 3G or later-generation mobile communication (that is, 3G or later-generation services) with the external device using the first channel and the second channel. Similarly, after detecting that a SIM card is placed in the second card slot 170 connected to the second baseband processor 120, the second baseband processor 120 may perform 3G or later-generation mobile communication with the external device using the third channel and the fourth channel. Because both the first baseband processor 110 and the second baseband processor 120 are provided with channels configured to transmit data, the first baseband processor 110 and the second baseband processor 120 can simultaneously perform the 3G or later-generation mobile communication. That is, the terminal 100 can simultaneously support 3G or later-generation services of multiple SIMs.

Further, to improve usage of the antennas and increase a data transmission rate, when the first baseband processor 110 performs data transmission with the external device, data transmission may also be performed using the channels connected to the second baseband processor 120. For example, when the first baseband processor 110 transmits data using the first channel, the first baseband processor 110 may transmit the data using the first channel and the third channel if the third channel is idle. For another example, when the first baseband processor 110 transmits data using the first channel and the second channel, the first baseband processor 110 transmits the data using the first channel, the second channel, the third channel, and the fourth channel if the third channel and the fourth channel are idle. Alternatively, when the first baseband processor 110 transmits data using the first channel and the second channel, the first baseband processor 110 transmits the data using the first channel, the second channel, and the third channel if the third channel is idle. The third channel or the fourth channel is idle, that is, the second baseband processor 120 currently does not transmit data using the third channel or the fourth channel.

It should be noted that, the two baseband processors (that is, the first baseband processor 110 and the second baseband processor 120) both support 2G, 3G, and 4G access capabilities. That is, the first baseband processor 110 may be connected to the first channel and the second channel to support the 4G access capability, and besides, among the first baseband processor 110, the first radio frequency chip 130, and the first antenna 151, there may also be a channel supporting the 2G and/or 3G access capability. The second baseband processor 120 may be connected to the third channel and the fourth channel to support the 4G access capability, and besides, among the second baseband processor 120, the second radio frequency chip 140, and the third antenna 153, there may also be a channel supporting the 2G and/or 3G access capability. When both the first channel and the second channel are idle (that is, when the first baseband processor 110 does not perform 4G services), the first channel and the second channel may be used by the second baseband processor 120. That is, the second baseband processor 120 may perform the 4G services using the first channel, the second channel, the third channel, and the fourth channel. In this case, the first baseband processor 110 may support the 2G/3G access capability using another channel, that is, the first baseband processor 110 may currently perform 2G/3G services. The antenna supporting 2G and 3G and the antenna supporting 4G may share an antenna, and the sharing of the antenna may be implemented using a diplexer.

A baseband processor in the embodiments of the present disclosure may include a modem chip, may also include a modem chip and a central processing unit (CPU), or may include a modem chip and a digital signal processor (DSP). The baseband processor may include a circuit or an integrated circuit (IC). For example, the baseband processor may include a single packaged IC, or may include multiple connected packaged ICs that have same functions or different functions. In a terminal device, a baseband processor and an application processor may be independent devices, or may be integrated in a device.

The following describes communication operating principles of the terminal 100 with reference to a specific example.

When the terminal 100 is turned on, the first baseband processor 110 and the second baseband processor 120 separately search for cells to be camped on and supported by SIM cards connected to the first baseband processor 110 and the second baseband processor 120, and separately access, according to identification information of the SIM cards connected to the first baseband processor 110 and the second baseband processor 120, communications networks of the corresponding cells to be camped on. For example, the first baseband processor 110 is connected to a 4G SIM card of a mobile operator (an operator) using the first card slot 160, and the second baseband processor 120 is connected to a 4G SIM card of a Unicom operator (an operator) using the second card slot 170. The first baseband processor 110 establishes, using the first channel and the second channel, a connection to a mobile network of a cell to be camped on. The second baseband processor 120 establishes, using the third channel and the fourth channel, a connection to a mobile network of a cell to be camped on.

In this example, the first antenna 151 and the third antenna 153 of the terminal 100 are main antennas, and the second antenna 152 and the fourth antenna 154 are diversity antennas. When the first baseband processor 110 receives an uplink service processing request such as a data upload service request, the first baseband processor 110 sends uplink data using the first channel. In this case, after determining that a mobile network connected to the first baseband processor 110 can support multi-channel transmission, the first baseband processor 110 determines whether the third channel that is connected to the second baseband processor 120 and also configured to transmit uplink data is idle. The first channel and the third channel jointly access the mobile network if the third channel is idle, and the uplink data is sent to the mobile network using the first channel and the third channel. When the uplink data transmission is completed, the first baseband processor 110 may release the third channel.

When the first baseband processor 110 receives a downlink service processing request such as a data download service request, the first baseband processor 110 receives downlink data using the first channel and the second channel. In this case, after determining that a mobile network connected to the first baseband processor 110 can support multi-channel transmission, the first baseband processor 110 determines whether the third channel and the fourth channel that are connected to the second baseband processor 120 and also configured to transmit downlink data are idle. The first channel, the second channel, and at least one of the third channel or the fourth channel jointly access the mobile network if the third channel and the fourth channel are idle, and the download data transmitted using the mobile network is jointly received using the first channel, the second channel, and the at least one of the third channel or the fourth channel. When the downlink data transmission is completed, the first baseband processor 110 may release the occupied third channel and/or fourth channel.

The first baseband processor 110 may select, according to a network connected to the first baseband processor 110 or requirements of a service to be processed, any one or two of the third channel or the fourth channel to transmit data. The requirements of the service include a volume of data to be transmitted of the service, requirements on a communication rate and communication quality, and the like. For example, if a network connected to the first baseband processor 110 supports only three-channel data transmission, or a requirement of a current service on communication quality is not high and a volume of data to be transmitted is not large, the first baseband processor 110 may select only the third channel to transmit the data together with the first channel and the second channel. If a network connected to the first baseband processor 110 can support four-channel data transmission, or a requirement of a current service on communication quality is high, or a volume of data to be transmitted is large, the first baseband processor 110 may select the third channel and the fourth channel to transmit the data together with the first channel and the second channel.

When multiple antennas are used to send or receive data, a Multiple-Input Multiple-Output (MIMO) technology may be used. When the first baseband processor 110 and a communications network thereof both support the MIMO, the first baseband processor 110 may use antennas on the corresponding channels of the first baseband processor 110 and an antenna on a corresponding idle channel of the second baseband processor 120 to form a MIMO antenna. That is, multiple transmit antennas and receive antennas are used separately on a transmit end and a receive end such that a signal is transmitted and received using multiple antennas of the transmit end and the receive end to improve data transmission quality. For example, when the first baseband processor 110 sends uplink data using the first channel, and the third channel is idle, the first baseband processor 110 use the first antenna 151 and the third antenna 153 to form a MIMO antenna to send the uplink data. For another example, when the first baseband processor 110 receives downlink data using the first channel and the second channel, and the third channel is idle, the first baseband processor 110 uses the first antenna 151, the second antenna 152, and the third antenna 153 to form a MIMO antenna to receive the downlink data.

It may be understood that, when the first baseband processor 110 transmits data using a channel connected to the second baseband processor 120, if it is detected that the second baseband processor 120 has a data transmission requirement, at least one channel connected to the second baseband processor 120 is yielded such that the second baseband processor 120 performs data transmission using the yielded channel.

In the terminal 100, the second baseband processor 120 is similar to the first baseband processor 110. When performing data transmission with an external device, the second baseband processor 120 may also use a channel connected to the first baseband processor 110 to perform the data transmission. For example, the second baseband processor 120 is connected to the first radio frequency chip 130 using the switch 180. The second baseband processor 120 may be connected to or disconnected from the first channel or the second channel by controlling the switch 180. When the second baseband processor 120 transmits data using the third channel, the second baseband processor 120 may transmit the data using the first channel and the third channel if the first channel is idle. For another example, when the second baseband processor 120 transmits data using the third channel and the fourth channel, the second baseband processor 120 transmits the data using the first channel, the second channel, the third channel, and the fourth channel if both the first channel and the second channel are idle. Alternatively, when the second baseband processor 120 transmits data using the third channel and the fourth channel, the second baseband processor 120 transmits the data using the first channel, the third channel, and the fourth channel if the first channel is idle. Refer to the specific description of the communication manner of the foregoing first baseband processor 110 for details, and details are not described herein again.

Figure 2:
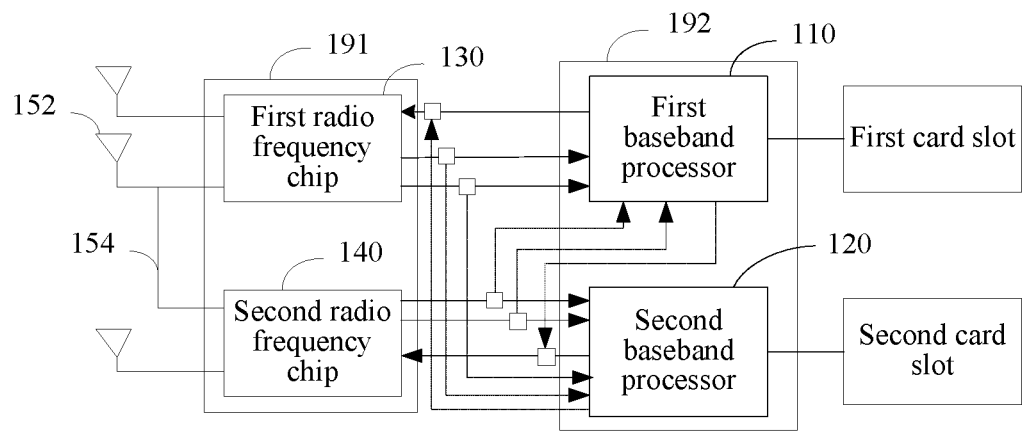
FIG. 2 is a schematic structural diagram of another terminal according to an embodiment of the present disclosure.

It should be noted that, in this embodiment, the second antenna 152 and the fourth antenna 154 are independently disposed in the terminal 100, the first baseband processor 110 and the second baseband processor 120 are independently disposed in the terminal 100, and the first radio frequency chip 130 and the second radio frequency chip 140 are independently disposed in the terminal 100. However, in another embodiment, a second antenna 152 and a fourth antenna 154 may be a same antenna, a first baseband processor 110 and a second baseband processor 120 may also be integrated in a processor 192, and the first radio frequency chip 130 and the second radio frequency chip 140 may also be disposed in a same radio frequency chip 191, as shown in FIG. 2. The second antenna 152 and the fourth antenna 154 are a same antenna, for example, a diversity antenna. That is, the first baseband processor 110 and the second baseband processor 120 may share a diversity antenna.

Figure 3:
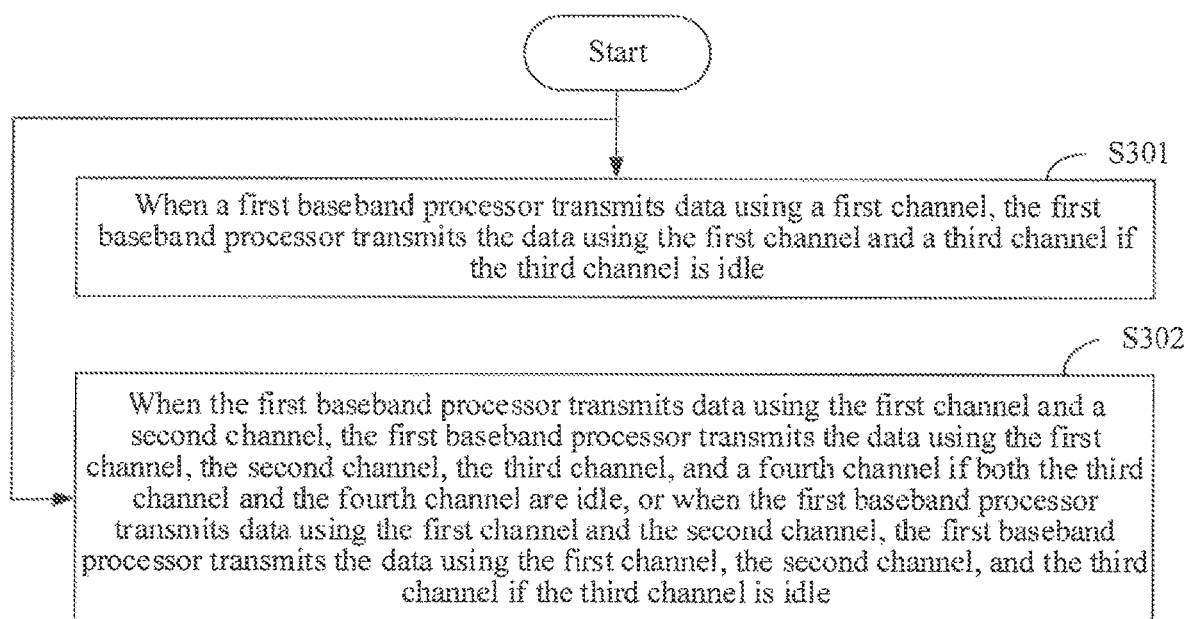
FIG. 3 is a flowchart of a communication method of a terminal according to an embodiment of the present disclosure.

Referring to FIG. 3, FIG. 3 is a flowchart of a communication method of a terminal according to an embodiment of the present disclosure. The terminal is the terminal 100 described in the foregoing embodiments. Refer to the description of the foregoing embodiments for details, and details are not described herein again. The communication method of the terminal includes the following steps.

Step S301: When the first baseband processor transmits data using the first channel, the first baseband processor transmits the data using the first channel and the third channel if the third channel is idle.

For example, the first antenna and the third antenna of the terminal are the foregoing main antennas, and the second antenna and the fourth antenna are the foregoing diversity antennas. That is, the first channel and the third channel are configured to transmit uplink data and downlink data, and the second channel and the fourth channel are configured to transmit downlink data.

When the first baseband processor receives an uplink service processing request such as a data upload service request, the first baseband processor sends uplink data using the first channel. In this case, after determining that a mobile network connected to the first baseband processor can support multi-channel transmission, the first baseband processor determines whether the third channel that is connected to the second baseband processor and also configured to transmit uplink data is idle. The first channel and the third channel jointly access the mobile network if the third channel is idle, and the uplink data is sent to the mobile network using the first channel and the third channel.

When the uplink data transmission is completed, the first baseband processor may release the third channel.

Step S302: When the first baseband processor transmits data using the first channel and the second channel, the first baseband processor transmits the data using the first channel, the second channel, the third channel, and the fourth channel if both the third channel and the fourth channel are idle, or when the first baseband processor transmits data using the first channel and the second channel, the first baseband processor transmits the data using the first channel, the second channel, and the third channel if the third channel is idle.

Following the example in step S301, when the first baseband processor receives a downlink service processing request such as a data download service request, the first baseband processor receives downlink data using the first channel and the second channel. In this case, after determining that a mobile network connected to the first baseband processor can support multi-channel transmission, the first baseband processor determines whether the third channel and the fourth channel that are connected to the second baseband processor and also configured to transmit downlink data are idle. The first channel, the second channel, and at least one of the third channel or the fourth channel jointly access the mobile network if the third channel and the fourth channel are idle, and the download data transmitted using the mobile network is jointly received using the first channel, the second channel, and the at least one of the third channel or the fourth channel.

When the downlink data transmission is completed, the first baseband processor may release the occupied third channel and/or fourth channel.

The first baseband processor may select, according to a network connected to the first baseband processor or requirements of a service to be processed, any one or two of the third channel or the fourth channel to transmit data. The requirements of the service include a volume of data to be transmitted of the service, requirements on a communication rate and communication quality, and the like. For example, if a network connected to the first baseband processor supports only three-channel data transmission, or a requirement of a current service on communication quality is not high and a volume of data to be transmitted is not large, the first baseband processor may select only the third channel to transmit the data together with the first channel and the second channel. If a network connected to the first baseband processor can support four-channel data transmission, or a requirement of a current service on communication quality is high, or a volume of data to be transmitted is large, the first baseband processor may select the third channel and the fourth channel to transmit the data together with the first channel, and the second channel.

In other embodiments, the communication method of the terminal may only include step S301 or step S302.

In another embodiment, step S301 may further include, when the first baseband processor sends uplink data using the first channel, and the third channel is idle, setting, by the first baseband processor, the first antenna and the third antenna to form a MIMO antenna to send the uplink data. Step S302 may further include, when the first baseband processor receives downlink data using the first channel and the second channel, and the third channel is idle, setting, by the first baseband processor, the first antenna, the second antenna, and the third antenna to form a MIMO antenna to receive the downlink data, or when the first baseband processor receives downlink data using the first channel and the second channel, and both the third channel and the fourth channel are idle, setting, by the first baseband processor, the first antenna, the second antenna, the third antenna, and the fourth antenna to form a MIMO antenna to receive the downlink data.

In the foregoing embodiment, the communication method may further include, when transmitting the data using a channel (for example, the third channel, or the third channel and the fourth channel) connected to the second baseband processor, yielding, by the first baseband processor, at least one channel connected to the second baseband processor if it is detected that the second baseband processor has a data transmission requirement such that the second baseband processor performs data transmission using the yielded channel.

In the foregoing embodiment, the communication method may further include when performing data transmission with an external device, performing, by the second baseband processor, the data transmission using a channel (for example, the first channel, or the first channel and the second channel) connected to the first baseband processor. Details are similar to the step of performing, by the first baseband processor, the data transmission using the channel of the second baseband processor. For example, when the second baseband processor transmits data using the third channel, the second baseband processor transmits the data using the first channel and the third channel if the first channel is idle. For another example, when the second baseband processor transmits data using the third channel and the fourth channel, the second baseband processor transmits the data using the first channel, the second channel, the third channel, and the fourth channel if both the first channel and the second channel are idle. Alternatively, when the second baseband processor transmits data using the third channel and the fourth channel, the second baseband processor transmits the data using the first channel, the third channel, and the fourth channel if the first channel is idle.

According to the embodiments of the present disclosure, the terminal is provided with a first baseband processor and a second baseband processor. The first baseband processor is connected to a first antenna and a second antenna using a first radio frequency chip, and the second baseband processor is connected to a third antenna and a fourth antenna using a second radio frequency chip. The first radio frequency chip is connected to the first antenna to form a first channel, the first radio frequency chip is connected to the second antenna to form a second channel, the second radio frequency chip is connected to the third antenna to form a third channel, and the second radio frequency chip is connected to the fourth antenna to form a fourth channel. The first baseband processor, the second baseband processor, the first radio frequency chip, and the second radio frequency chip all support 3G or later-generation access capabilities. Because the first baseband processor and the second baseband processor each are provided with channels that are configured to transmit data and support 3G or later-generation access capabilities, two SIM cards can simultaneously perform services of 3G or later generations. Further, when performing data transmission using the channels connected to the first baseband processor, the first baseband processor may use an idle channel connected to the second baseband processor to perform the data transmission. That is, the first baseband processor can dynamically configure the channels connected to the first baseband processor and the second baseband processor in order to improve usage of the antennas and increase a data transmission rate.

In the several implementations provided in the embodiments of the present disclosure, it should be understood that the disclosed system, apparatus, and method may be implemented in other manners. For example, the described apparatus implementation is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in implementations of the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions in the embodiments of the present disclosure essentially, or the part contributing to other approaches, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

What is claimed is:

1. A terminal, comprising:
   a first card slot;
   a second card slot;
   a first antenna;
   a second antenna;
   a third antenna;
   a fourth antenna;
   a first baseband processor coupled to the first card slot;
   a second baseband processor coupled to the second card slot;
   a first radio frequency chip coupled to the first baseband processor, wherein the first baseband processor is further coupled to the first antenna using the first radio frequency chip, wherein the first radio frequency chip is further coupled to the first antenna to form a first channel, wherein the first baseband processor is further coupled to the second antenna using the first radio frequency chip, and wherein the first radio frequency chip is coupled to the second antenna to form a second channel;
   a second radio frequency chip coupled to the second baseband processor, wherein the second baseband processor is coupled to the third antenna using the second radio frequency chip, wherein the second radio frequency chip is further coupled to the third antenna to form a third channel, wherein the second baseband processor is further coupled to the fourth antenna using the second radio frequency chip, and wherein the second radio frequency chip is further coupled to the fourth antenna to form a fourth channel; and
   one or more first switches coupled to the first baseband processor and the first radio frequency chip between the first baseband processor and the first radio frequency chip,
   wherein the first baseband processor, the second baseband processor, the first radio frequency chip, and the second radio frequency chip all are configured to support an access capability of a third-generation mobile communications technology (3G) or later-generation mobile communications technology such that the first baseband processor and the second baseband processor are configured to simultaneously perform services of the 3G or later-generation mobile communications technology, wherein the first channel, the second channel, the third channel, and the fourth channel are configured to transmit data between the terminal and an external device; and further comprising one or more second switches, wherein the first baseband processor is coupled to the second radio frequency chip using the one or more second switches, and wherein the first baseband processor is configured to transmit the data using the first channel and the third channel when the first baseband processor is coupled to the second radio frequency chip and the third channel is idle.

2. The terminal of claim 1, further comprising one or more second switches, wherein the first baseband processor is coupled to the second radio frequency chip using the one or more second switches, wherein the first baseband processor is configured to transmit the data using the first channel, the second channel, the third channel, and the fourth channel when the first baseband processor is coupled to the second radio frequency chip and third channel and the fourth channel are idle.

3. The terminal of claim 1, wherein the first baseband processor and the second baseband processor are integrated in one processor, wherein the first baseband processor is coupled to a first subscriber identity module (SIM) card in the first card slot and the second baseband processor is coupled to a second SIM card in the second card slot, and wherein the first baseband processor and the second baseband processor are configured to simultaneously perform fourth-generation (4G) or later-generation communication services using the first SIM card and the second SIM card, respectively.

4. The terminal of claim 1, wherein the second antenna and the fourth antenna share a same antenna.

5. The terminal of claim 1, wherein the first antenna and the third antenna are main antennas, and wherein the second antenna and the fourth antenna are diversity antennas.

6. The terminal of claim 1, wherein the first card slot is configured to receive a first subscriber identity module (SIM) card and the second card slot is configured to receive a second SIM card, wherein the first SIM card and the second SIM card are configured to simultaneously support services of the 3G or later-generation mobile communications technology, and wherein the 3G or later-generation mobile communications technology comprises at least one of:
the 3G;
a fourth-generation mobile communications technology (4G); or
a fifth-generation mobile communications technology (5G).

7. A communication method of a terminal, wherein the terminal comprises a first card slot, a second card slot, a first baseband processor coupled to the first card slot, a second baseband processor coupled to the second card slot, a first radio frequency chip coupled to the first baseband processor, a second radio frequency chip coupled to the second baseband processor, a first antenna, a second antenna, a third antenna, and a fourth antenna, and wherein the communication method comprises:
coupling the first baseband processor to the first radio frequency chip using one or more first switches that are coupled to the first baseband processor and the first radio frequency chip between the first baseband processor and the first radio frequency chip;

transmitting, by the first baseband processor, first data using a first channel when the first baseband processor is coupled to the first radio frequency chip using the one or more first switches,
coupling the first baseband processor to the second radio frequency chip using one or more second switches;
transmitting, by the first baseband processor, second data using the first channel and a third channel when the third channel is idle and the first baseband processor is coupled to the second radio frequency chip,
wherein the first baseband processor, the second baseband processor, the first radio frequency chip, and the second radio frequency chip all are configured to support an access capability of a third-generation mobile communications technology (3G) or later-generation mobile communications technology such that the first baseband processor and the second baseband processor are configured to simultaneously perform services of the 3G or later-generation mobile communications technology,
wherein the first baseband processor is coupled to the first antenna using the first radio frequency chip,
wherein the first radio frequency chip is coupled to the first antenna to form the first channel,
wherein the first baseband processor is coupled to the second antenna using the first radio frequency chip,
wherein the first radio frequency chip is coupled to the second antenna to form a second channel,
wherein the second baseband processor is coupled to the third antenna using the second radio frequency chip,
wherein the second radio frequency chip is coupled to the third antenna to form the third channel,
wherein the second baseband processor is coupled to the fourth antenna using the second radio frequency chip, and
wherein the second radio frequency chip is coupled to the fourth antenna to form a fourth channel.

8. The method of claim 7, wherein the first baseband processor and the second baseband processor are integrated in one processor, and wherein the first radio frequency chip and the second radio frequency chip are disposed in a same frequency chip.

9. The method of claim 7, wherein the second antenna and the fourth antenna share a same antenna.

10. The method of claim 7, wherein the first antenna and the third antenna are main antennas, and wherein the second antenna and the fourth antenna are diversity antennas.

11. The method of claim 7, wherein the 3G or later-generation mobile communications technology comprises at least one of:
a fourth-generation mobile communications technology (4G); or
a fifth-generation mobile communications technology (5G).

12. The terminal of claim 1, further comprising one or more second switches, wherein the first baseband processor is coupled to the second radio frequency chip using the one or more second switches, wherein the first baseband processor is configured to transmit the data using the first channel, the second channel, and the third channel when the first baseband processor is coupled to the second radio frequency chip and the third channel is idle.

13. The terminal of claim 1, wherein the first baseband processor and the second baseband processor are independently disposed in the terminal.

14. The terminal of claim 1, wherein the second antenna and the fourth antenna are independently disposed in the terminal.

15. The method of claim 7, wherein the second antenna and the fourth antenna are independently disposed in the terminal.

16. A communication method of a terminal, wherein the terminal comprises a first card slot, a second card slot, a first baseband processor coupled to the first card slot, a second baseband processor coupled to the second card slot, a first radio frequency chip coupled to the first baseband processor, a second radio frequency chip coupled to the second baseband processor, a first antenna, a second antenna, a third antenna, and a fourth antenna, and wherein the communication method comprises:

coupling the first baseband processor to the first radio frequency chip using one or more first switches that are coupled to the first baseband processor and the first radio frequency chip between the first baseband processor and the first radio frequency chip;

transmitting, by the first baseband processor, first data using a first channel and a second channel;

coupling the first baseband processor to the second radio frequency chip using one or more second switches;

transmitting, by the first baseband processor, second data using the first channel, the second channel, and a third channel when the third channel is idle and the first baseband processor is coupled to the second radio frequency chip, wherein the first baseband processor, the second baseband processor, the first radio frequency chip, and the second radio frequency chip all are configured to support an access capability of a third-generation mobile communications technology (3G) or later-generation mobile communications technology such that the first baseband processor and the second baseband processor are configured to simultaneously perform services of the 3G or later-generation mobile communications technology, wherein the first baseband processor is coupled to the first antenna using the first radio frequency chip, wherein the first radio frequency chip is coupled to the first antenna to form the first channel, wherein the first baseband processor is coupled to the second antenna using the first radio frequency chip, wherein the first radio frequency chip is coupled to the second antenna to form the second channel, wherein the second baseband processor is coupled to the third antenna using the second radio frequency chip, wherein the second radio frequency chip is coupled to the third antenna to form the third channel, wherein the second baseband processor is coupled to the fourth antenna using the second radio frequency chip, and wherein the second radio frequency chip is coupled to the fourth antenna to form a fourth channel.

17. The method of claim 16, further comprising transmitting, by the first baseband processor, third data using the first channel, the second channel, the third channel, and the fourth channel when the first baseband processor is coupled to the second radio frequency chip and the third channel and the fourth channel are idle.

18. The method of claim 16, wherein the second antenna and the fourth antenna are a same antenna.

19. The method of claim 16, wherein the first antenna and the third antenna are main antennas configured to perform uplink and downlink transmissions between the terminal and an external device, and wherein the second antenna and the fourth antenna are diversity antennas configured to perform downlink transmissions between the terminal and the external device.

* * * * *